US009670036B2

(12) United States Patent
Belder et al.

(10) Patent No.: US 9,670,036 B2
(45) Date of Patent: Jun. 6, 2017

(54) CLAMP SYSTEM, GRIPPING DEVICE THEREFORE AND METHOD OF USING THE CLAMP SYSTEM

(71) Applicant: IHC HOLLAND IE B.V., Sliedrecht (NL)

(72) Inventors: Cornelis Belder, Oudewater (NL); Klaas-Jan Mulderij, Delfgauw (NL)

(73) Assignee: IHC Holland IE B.V., Sliedrecht (NL)

( * ) Notice: Subject to any disclaimer, the term of this patent is extended or adjusted under 35 U.S.C. 154(b) by 0 days.

(21) Appl. No.: 14/767,684

(22) PCT Filed: Feb. 13, 2014

(86) PCT No.: PCT/NL2014/050088
§ 371 (c)(1),
(2) Date: Aug. 13, 2015

(87) PCT Pub. No.: WO2014/126465
PCT Pub. Date: Aug. 21, 2014

(65) Prior Publication Data

US 2015/0368073 A1 Dec. 24, 2015

(30) Foreign Application Priority Data

Feb. 14, 2013 (NL) ...................................... 2010299

(51) Int. Cl.
*B25J 15/00* (2006.01)
*B66C 1/44* (2006.01)
(Continued)

(52) U.S. Cl.
CPC ................ *B66C 1/44* (2013.01); *B66C 1/447* (2013.01); *B66C 1/56* (2013.01); *E02B 17/06* (2013.01); *E02B 17/0854* (2013.01)

(58) Field of Classification Search
CPC .. B66C 1/44; B66C 1/447; B66C 1/56; E02B 17/06; E02B 17/0854; E21B 19/07; E21B 19/10; E21B 19/06
(Continued)

(56) References Cited

U.S. PATENT DOCUMENTS 1,693,478 A * 11/1928 Davis ...................... E21B 19/10
294/113
1,721,024 A * 7/1929 Krell ....................... E21B 19/07
294/102.2
(Continued)

FOREIGN PATENT DOCUMENTS

GB 1 015 381 A 12/1965
GB 1015381 A * 12/1965 ............. B21C 47/26
(Continued)

OTHER PUBLICATIONS

Stats Group, Pipe Handling, UK-GRA-REF-027 Rev03 Pipe Handling, www.statsgroup.com © Stats Group.
(Continued)

*Primary Examiner* — Gabriela Puig
(74) *Attorney, Agent, or Firm* — NLO N.V.; Catherine A. Shultz; Minerva Rivero

(57) ABSTRACT

In a clamp system for a slender object (16), such as a pile or pipe and the like, a clamp (1) and the object are to be applied around one another. The clamp has a frame (4) defining an axial direction. Furthermore, gripping devices (3) are provided which are spaced in circumferential direction of the frame (4). A stop (25) defines an end position of the gripping device (3), the gripping device (3) in gripping state and positioned in the end position prevents the object (16) from displacing with respect to the frame (4) in a first axial direction of the passage (9), in which first axial direction the gripping device (3) is held pressed against the stop (25), and the gripping device (3) allowing the object (16) to displace
(Continued)

with respect to the frame in the second axial direction opposite the first axial direction.

18 Claims, 6 Drawing Sheets

(51) Int. Cl.

| | |
|---|---|
| ***E02B 17/06*** | (2006.01) |
| ***E02B 17/08*** | (2006.01) |
| ***B66C 1/56*** | (2006.01) |

(58) Field of Classification Search
USPC ......... 294/207, 102.2, 90, 86.26–86.34, 194, 294/198, 192
See application file for complete search history.

(56) References Cited

U.S. PATENT DOCUMENTS

| | | | | |
|---|---|---|---|---|
| 1,797,494 | A * | 3/1931 | Campbell | E21B 19/07 192/17 R |
| 3,268,968 | A * | 8/1966 | Crickmer | E21B 19/10 16/110.1 |
| 3,720,435 | A | 3/1973 | Leyn | |
| 4,354,706 | A * | 10/1982 | Coyle, Sr. | E21B 19/07 175/423 |
| 4,940,118 | A | 7/1990 | Cox | |
| 6,915,868 | B1 * | 7/2005 | Mosing | E21B 19/06 166/380 |
| 7,992,634 | B2 * | 8/2011 | Angelle | E21B 19/07 166/77.52 |
| 8,764,083 | B2 * | 7/2014 | Belder | B66C 1/442 294/106 |
| 2009/0120649 | A1 * | 5/2009 | Cerovsek | E21B 19/10 166/380 |
| 2009/0272542 | A1 * | 11/2009 | Begnaud | E21B 19/07 166/380 |
| 2011/0243668 | A1 | 10/2011 | White | |
| 2012/0325496 | A1 | 12/2012 | Angelle et al. | |
| 2012/0326459 | A1 * | 12/2012 | Angelle | E21B 19/07 294/90 |
| 2014/0205421 | A1 * | 7/2014 | Bouligny, Jr. | E21B 19/07 414/800 |
| 2014/0353997 | A1 * | 12/2014 | Fox | B25J 15/0028 294/192 |
| 2015/0240575 | A1 * | 8/2015 | Angelle | E21B 19/07 166/382 |
| 2015/0259991 | A1 * | 9/2015 | Sipos | E21B 19/06 294/201 |
| 2015/0275592 | A1 * | 10/2015 | Wood | E21B 19/16 166/380 |
| 2015/0376856 | A1 * | 12/2015 | Rosponi | E02B 17/089 405/196 |

FOREIGN PATENT DOCUMENTS

| | | | |
|---|---|---|---|
| GB | 2486200 | A | 6/2012 |
| JP | 06200527 | A | 7/1994 |
| JP | 941866 | A | 10/1997 |
| WO | 2006/118456 | A1 | 11/2006 |
| WO | 2011005501 | A2 | 1/2011 |
| WO | 2011/060772 | A2 | 5/2011 |
| WO | 2012/053892 | A2 | 4/2012 |

OTHER PUBLICATIONS

International Search Report, dated Jun. 3, 2014, from corresponding PCT application.

* cited by examiner

CLAMP SYSTEM, GRIPPING DEVICE THEREFORE AND METHOD OF USING THE CLAMP SYSTEM

BACKGROUND

The invention is related to a clamp system for a slender object, such as a pile or pipe and the like, said clamp system comprising a frame defining a longitudinal axis, wherein the object and the frame are to be arranged around one another in such a way that the longitudinal axis of the frame is generally parallel to the longitudinal axis of the object, as well as clamping means for clamping the object with respect to the frame.

Such a clamp system is known. The clamp system may be arranged around the object, or may be inserted into therein in case the object is hollow. Generally, the object may be clamped by means of such clamp system in such a way that the object is immovably held in opposite directions along the longitudinal axis.

US2009120649 A1 discloses a slip assembly for gripping a pipe during well drilling operations. The assembly has a housing with a hole for receiving a section of pipe. Pockets in the housing are spaced circumferentially around the hole. Each of the pockets has side walls that face toward each other and are connected to each other by a back wall that has a ramp surface. A slip segment is located in each pocket, each slip segment having side edges that engage the side walls of one of the pockets. Each slip segment has a back side with a ramp surface that engages the ramp surface on the back wall of the pocket. Each of the slip segments is movable within its pocket from an upper outward position to a lower inward position in gripping engagement with the pipe. The slip assembly holds pipes in a vertical position. The ramp sections hold the pipe firmly. Once the assembly firmly holds the pipe, axial movement of the pipe is not possible anymore.

In specific cases however it is desirable to hold the object clamped in one direction along the longitudinal axis only. In the opposite direction, the object should then be allowed to be displaced with respect to the clamp system, without inactivating the clamp system.

SUMMARY

The object of the invention is therefore to provide a clamp system which is active in one direction along the longitudinal axis only.

This object is achieved in that the clamping means comprise:

at least one gripping device which is rotatably connected to the frame according to an axis of rotation which is oriented transversely with respect to the longitudinal axis of the frame, said gripping device having a gripping state for clamping said object with respect to the frame and an idle state, and at least one stop which defines an end position of the gripping device, said gripping device in gripping state and positioned in said end position preventing the object from displacing with respect to the frame in a first axial direction along the longitudinal axis of the frame, in which first axial direction the gripping device is held pressed against the stop, and said gripping device allowing the object to displace with respect to the frame in a second axial direction opposite the first axial direction.

Thus, the slender object is held fixedly in the first axial direction, but nevertheless may be moved away in the opposite direction as a result of the circumstance that the gripping device is not stabilized in that direction. As soon as the object is moved in that the direction, the gripping device will tilt around its axis of rotation. Also, the gripping force exerted by the gripping device on the object will then be reduced as a result of this tilting effect, whereby the desired movement of the object is further promoted.

Preferably, a gripping device is mounted to the frame by means of a respective pivot. Thus, the gripping device is displaceable between an active position which is radially and/or transversely oriented with respect to the longitudinal axis of the frame and an inactive position slanted with respect to the radially respectively transversally oriented active position. The stop may be provided on the frame and/or a base or mounting. The base or mounting may be carried out as separate components, however they may also be carried out as an integral part of the frame. In order to ensure the proper gripping action, a gripping device is preferably biased toward the stop, such as by an elastic pretension. The movement of the gripping device away from the stop occurs in the direction opposite to the direction of the biasing force.

The clamp system may be carried out in various ways. According to a first embodiment, the clamp system may be designed for introduction in a hollow object, in which case the gripping device is carried out for gripping the internal surface of the hollow object. According to another embodiment, the clamp system may be designed for surrounding the object, in which case the frame delimits a passage for accommodating the object and the gripping device is carried out for gripping the external surface of the object.

In the latter embodiment, the frame may comprise frame halves which are connected to each other through a hinge the hinge axis of which is generally parallel to the longitudinal axis of the frame, said frame halves being transferrable between an active position closed onto each other around the object, and an open position in which the frame can be positioned on the object. Furthermore, closure means may be provided on the frame halves for holding said frame halves pressed onto each other respectively for giving said frame halves free.

According to another embodiment, the clamp system may comprising a wedge type clamp having wedge assemblies associated with the frame for providing frictional engagement with said object as a result of a relative displacement of the wedge type clamp with respect to the object according to the longitudinal axis.

Such a clamp system is generally known. Once the wedge type clamp has been arranged around the object, the wedge assemblies can be activated so as to obtain an initial clamping action on the object. Subsequently, the clamping action may be increased due to the frame and the object displacing with respect to each other under influence of e.g. gravity or a traction force until the relative movement stops and an equilibrium is obtained between these forces and the frictional forces generated by the clamping action. The advantage of such a wedge type clamp is its inherent redundancy, which guarantees that the object can be lifted without running the risk of slipping out of the wedge type clamp.

Usually, the initial clamping action is initiated by energizing specific wedge assembly actuators, such as hydraulic piston/cylinder devices. Thereby, also objects which are oriented horizontally in a lying position may be gripped. In the process of subsequently upending the object, the clamping action increases under the influence of gravity forces which act on the object, and which make that the wedge assemblies are further clamped onto the object.

It will be clear that the initial stage of such lifting operation carried out on a lying object is critical. The clamping action exerted by the wedge assemblies is completely dependent on the actuating force of the piston/cylinder devices which act on the wedge assemblies. It appears that in specific cases however, this initial clamping action is not sufficient to fix the position of the wedge type clamp with respect to the object. Dependent on the hoisting forces exerted on the wedge type clamp, slip may occur between the wedge type clamp and the object which would render the lifting operation impossible.

Therefore a further improvement can be obtained in a clamp system as described before which is better suited for lifting lying objects. This improvement entails that a gripping device is arranged with respect to the wedge assemblies in such a way that during said relative displacement of the object and the wedge type clamp said gripping device is transferred from the gripping state, in which the object is held with respect to the frame by the gripping devices, into the idle state so as to establish said frictional engagement between the wedge assemblies and the object.

In the clamp system according to the invention, the wedge type clamp is arranged around the object as usual. Next, the wedge assemblies are activated and subsequently the gripping devices which are mounted on the frame in addition to the wedge assemblies, are activated such that the object is fixedly held with respect to the frame. Under these conditions, the object can be lifted safely, without the risk of sliding out of the wedge type clamp. Subsequently, the object may be transferred to a more upright position which would allow the wedge assemblies to provide frictional engagement if they were allowed to move relative to the object. In order to make this relative movement possible, it is necessary that the gripping devices gradually give way. The proper arrangement of the gripping devices with respect to the wedge type assemblies enables such gradual transition from a holding force exerted by the gripping devices, to a holding force exerted by the wedge assemblies.

The gripping devices are mounted to the frame by means of a respective pivot which allows rotation according to a respective pivot axis which is oriented tangentially or transversally with respect to the frame, and which gripping devices are displaceable between a active position which is radially or transversely oriented with respect to the longitudinal axis of the frame and an inactive position slanted with respect to the radially or transversely oriented active position.

In this system, a gradual release of the gripping action of the gripping devices on the object is obtained by allowing the gripping devices to move together with the object while this object is being displaced relative to the wedge type clamp under the influence of gravity during the process of upending the object. Simultaneously, this relative displacement also makes the wedge assemblies come into action, in such a way that they, at the same time as the gripping devices give way, start to increase their wedging action on the object. Thus, a safe and reliable transfer from gripping the object by the gripping devices to gripping by the wedge assemblies is guaranteed.

Preferably, the gripping devices are positioned at a distance in axial direction from the wedge assemblies. Also, the gripping devices may be oriented in radial direction with respect to the frame, and/or transversely with respect to the longitudinal axis of the frame. Thus, the gripping devices may be pivotable out of the radial or transverse in accordance with the direction in which the wedge assemblies are activated. The frame has opposite ends in axial direction, in such a way that the gripping devices are positioned on the end which faces in the clamping direction of the wedge assemblies.

The invention is furthermore related to a gripping device for a clamp body system as described before, comprising a piston/cylinder device which is transferrable between an active position in which the piston extends with respect to the cylinder, and an inactive position in which the piston is retracted with respect to the cylinder, as well as a base for mounting onto the frame and onto which base the piston/cylinder device is connected through a pivot the pivot axis of which is oriented transverse with respect to the longitudinal direction of the piston/cylinder device.

Also, the invention is related to a method for lifting a slender object by means of the clamp system as described before, comprising the steps of:

fitting the clamp around a lying object, activating the gripping devices so as grip the external surface of the lying object, lifting the object gripped by the gripping devices and transferring said object towards an upright position, during the process of transferring the object to the upright position, displacing the object with respect to the frame so as to activate or further activate the wedge assemblies, and during the process of transferring the object to the upright position, transferring the gripping devices from the gripping state into the idle state.

Alternatively, the method may comprise the steps of:

introducing the frame in the lying object, activating one or more gripping devices so as to grip the internal surface of the lying object, lifting the object gripped by the gripping device(s) and transferring said object towards an upright position, during the process of transferring the object to the upright position, displacing the object with respect to the frame so as to activate or further activate the wedge assemblies thereof, and during the process of transferring the object to the upright position, transferring the gripping device(s) from the gripping state into the idle state.

In particular, this method may comprise the step of:

during the process of transferring the object to the upright position, transferring the gripping devices from the gripping state into the idle state by making the gripping devices rotate about the respective pivot axis thereof.

Also, this method may comprise the steps of:

displacing the object with respect to the clamp under the influence of gravity as a result of transferring the object towards the upright position, during the step of displacing the object with respect to the clamp, pivoting the gripping device out of the gripping position into the idle position.

BRIEF DESCRIPTION OF THE DRAWINGS

The invention will now be described further with reference to the embodiment of the clamp system as shown in the drawings.

DETAILED DESCRIPTION

Figure 1:
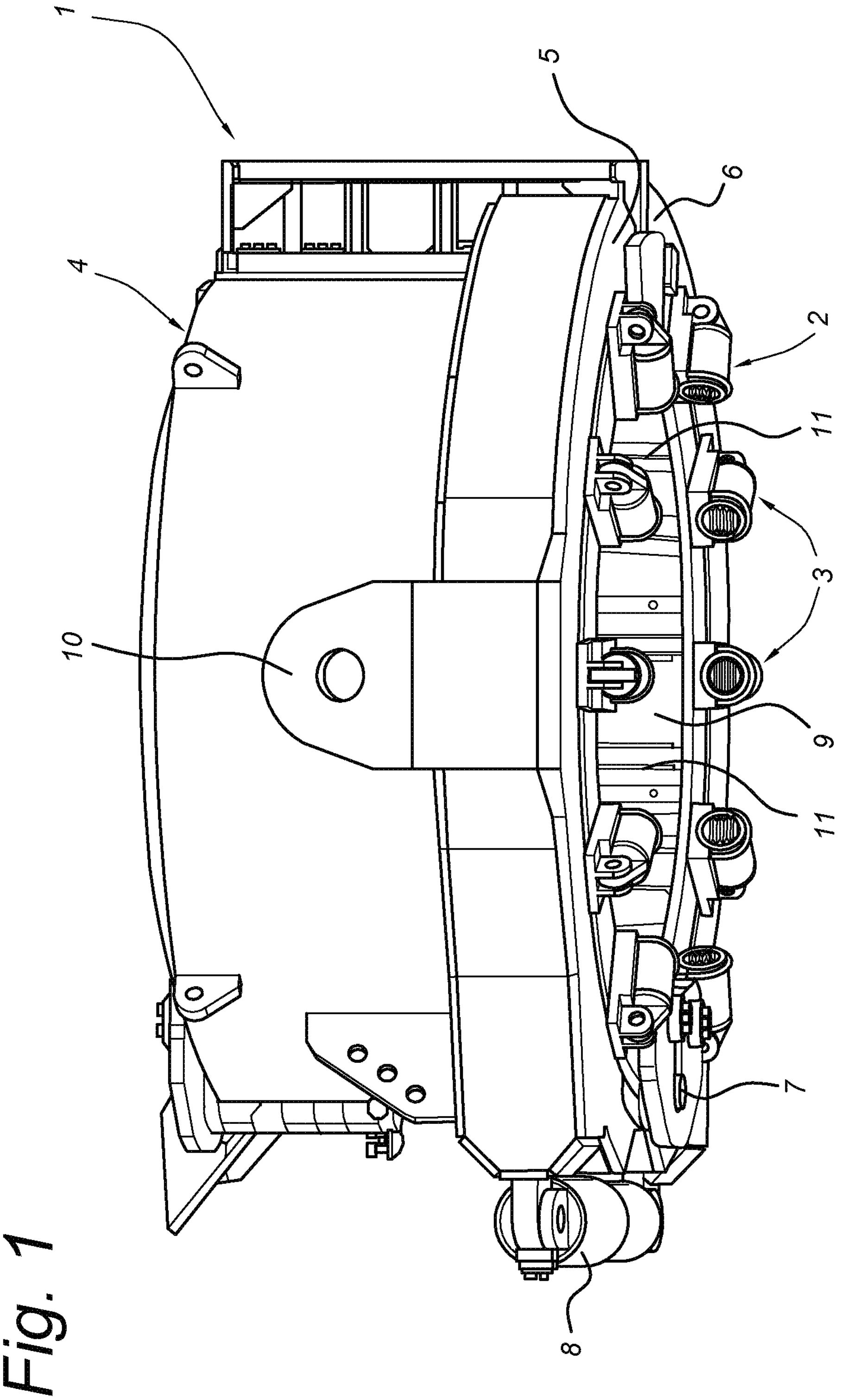
FIG. 1 shows a view in perspective from below on a first embodiment of the clamp system.
Figure 2:
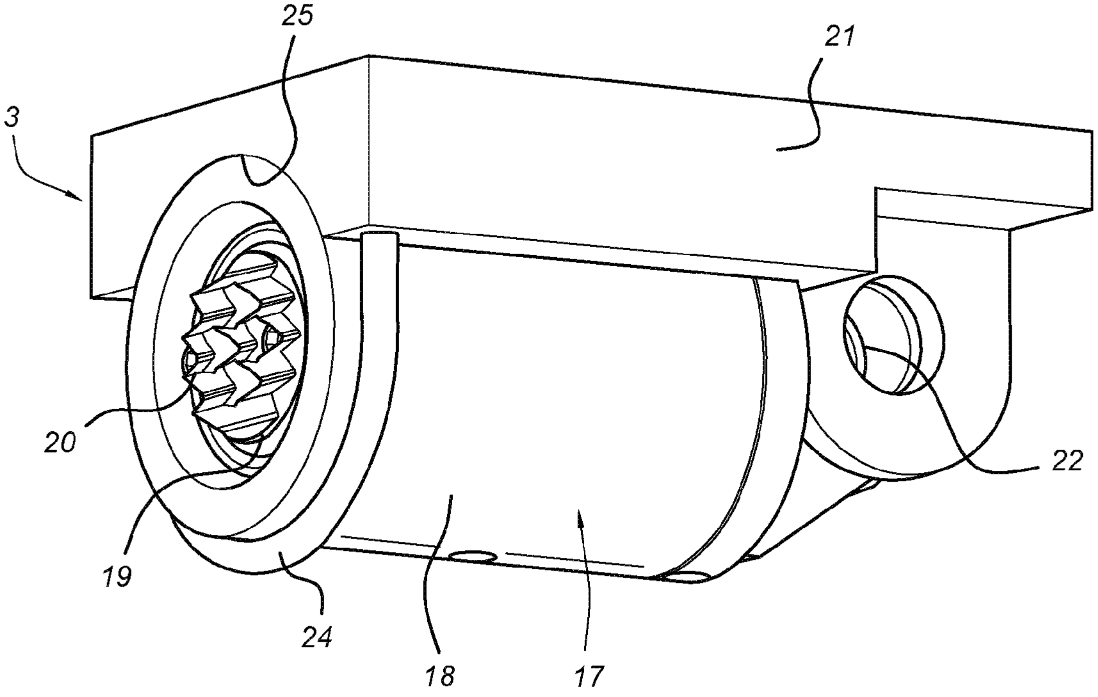
FIG. 2 shows a view in perspective of a gripping device for the clamp system of FIG. 1.

The first embodiment of the clamp system as shown in FIG. 1 consists of the wedge type clamp which has generally been denoted by reference numeral 1, as well as the series 2 of gripping devices 3. The wedge type clamp 1 has an annular frame 4 which consists of two frame halves 5, 6 which are connected to each other through the hinge 7 and an actuator means 8 at one end. By energizing the actuator 8, the frame halves 5, 6 can be swung around the hinge 7 between an open position and the closed as shown. In the open position, the frame halves can be located around an object which upon closure of the frame halves 5, 6 is then be accommodated within the internal space 9 of the frame 4. The clamp system can be lifted by means of the lugs 10, onto which hoisting cables of a crane and the like are to be mounted.

Around the internal space 9 of the frame, several wedge assemblies 11 have been spaced. These wedge assemblies are shown in radial section in FIGS. 6 and 7, and consist in a known way of wedge parts 12, 13 which are slideable along each other according to the slanting surfaces 14. The inner wedge part 13 has a friction surface 15 which engages the external surface 30 of the object 16, as shown in FIGS. 3-7. The initial frictional engagement between the wedge assembly 11 and the object can be obtained by means of the wedge assembly actuator 26. In the upright position, the wedge assemblies 11 additionally clamp the object 16 securely in the internal space 9 of the wedge type clamp 1 under the influence of gravity, the clamp system itself being suspended from a crane and the like by hoisting cables 23 connected to the lugs 10 (only one of these being shown in FIG. 3).

Figure 6:
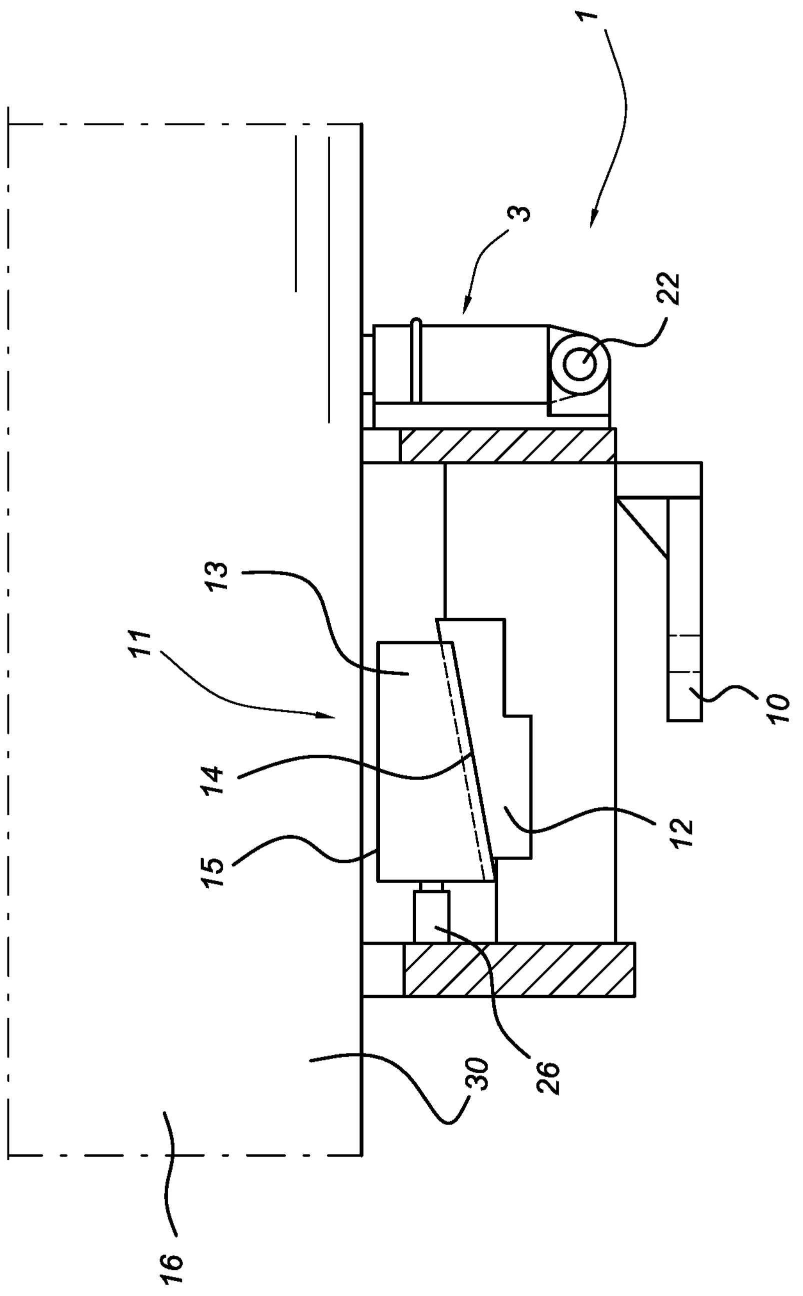
FIG. 6 shows part of the clamp system of FIG. 1 as applied on a lying object as according to FIG. 3.
Figure 7:
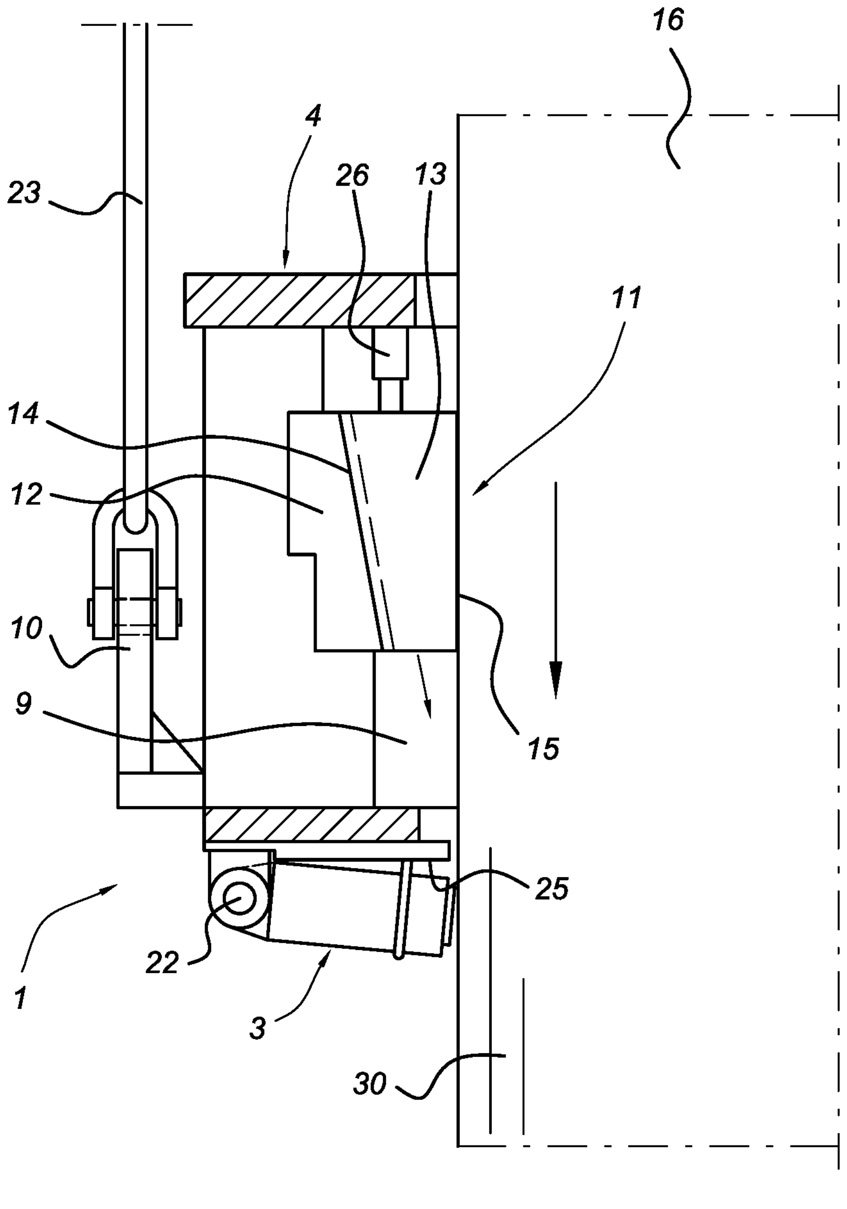
FIG. 7 shows part of the clamp system of FIG. 1 as applied on an upended object as according to FIG. 5.

In a lying position of the object 16 as shown in FIG. 6, this clamping action of the wedge assemblies is limited, as gravity does not influence the position of the object 16 and the clamp system 1 with respect to each other. With the aim of still being able to lift the object from this lying position in a secure and reliable way, the series 2 of gripping devices 3 have been mounted on one axial end of the frame 4. These gripping devices 3 consist each of a piston/cylinder device 17 and the mounting plate 21. The housing 18 thereof is connected to the mounting plate 21 through the pivot 22, the pivot axis of which runs transverse with respect to the longitudinal axis of the piston/cylinder device 17. The piston 19 has a gripping surface 20 at its free end. By means of a spring member 24 which is slung around the housing 18 and both ends of which are connected to the mounting plate 21, the piston/cylinder device 17 is biased against said mounting plate 21 and is held under pretension against the stop face 25 thereof.

After the clamp system 1 has been arranged around the object 16 by opening and subsequently closing the frame halves 5, 6, the gripping devices 3 are energized in such a way that the gripping surfaces 20 thereof are pressed onto the object. Thereby, a stable position of the object 16 with respect to the clamp system 1 is obtained. The spring members 24 are holding the piston/cylinder devices 3 in the clamping position, at right angles to the axis of the frame 4.

As soon as the object is hoisted somewhat in this condition, it starts to tilt. Thereby, the force of gravity obtains a component which is directed along the longitudinal direction of the object and the axis of the frame. Initially, any movement of the object under the influence of this gravity force component with respect to the frame is prevented by the spring members 24 which hold the piston/cylinder devices in position against the corresponding stop faces 25. As soon as however the gravity force component in question surpasses a certain threshold, the spring elements 24 give way and the piston/cylinder devices start to rotate around the pivots 22. This makes that the wedge assemblies 11 start to exert a friction force on the object 16, in such a way that finally the full gravitational force acting on the object 16 is borne by said wedge assemblies. The gripping devices 3 then lie idle against the object 16, without having any effect anymore on the lifting of the object.

Figure 3:
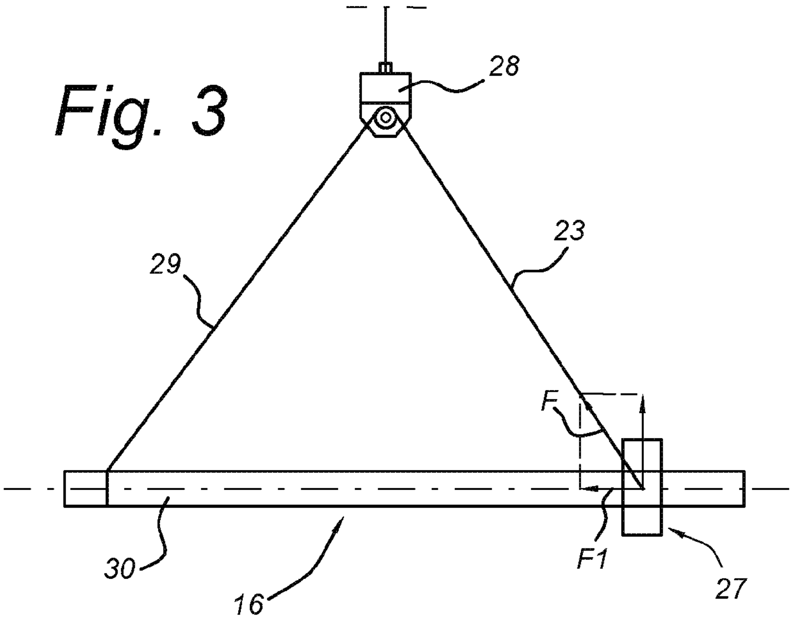
FIGS. 3-5 show several stages of the process of lifting and upending an object.
Figure 4:
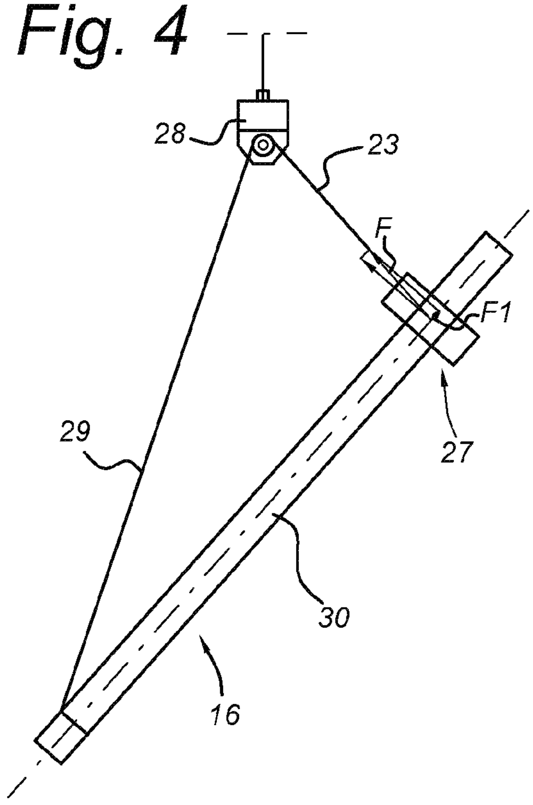
Figure 5:
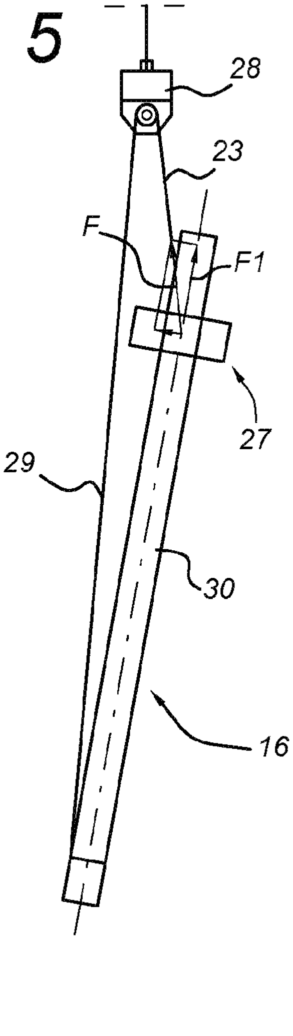

FIGS. 3-5 show a particular lifting operation in which the clamp assembly may be used in a particular beneficial way. As shown, the object 11 has a lying or horizontal position. Near one of its ends, the clamp system 27 is positioned, a first hoisting cable 23 extending between the clamp system 27 and a double hoisting block 28 suspended from a crane (not shown). Furthermore, a second hoisting cable 29 extends between this double hoisting block 28 and the object 11, near the other end thereof.

The force F as exerted by the first hoisting cable 23 on the clamp system 27 has a component $F_1$ which is oriented according to the axis of the clamp system 27, and counter to the direction in which the wedge assemblies thereof would be activated. In such case, the clamping action exerted by the wedge assemblies on the object, as obtained after energizing the actuators thereof, appears to be insufficient to stabilize the clamp system 27 with respect to the object 11. However, by energizing the gripping devices 3 as described before, such stable position of the clamp system 27 can still be obtained. As the force component $F_1$ causes the piston/cylinder devices 17 to be pressed firmly onto the corresponding stop faces 25, the stability of the clamp system 27 with respect to the object is furthermore ascertained.

Figure 8:
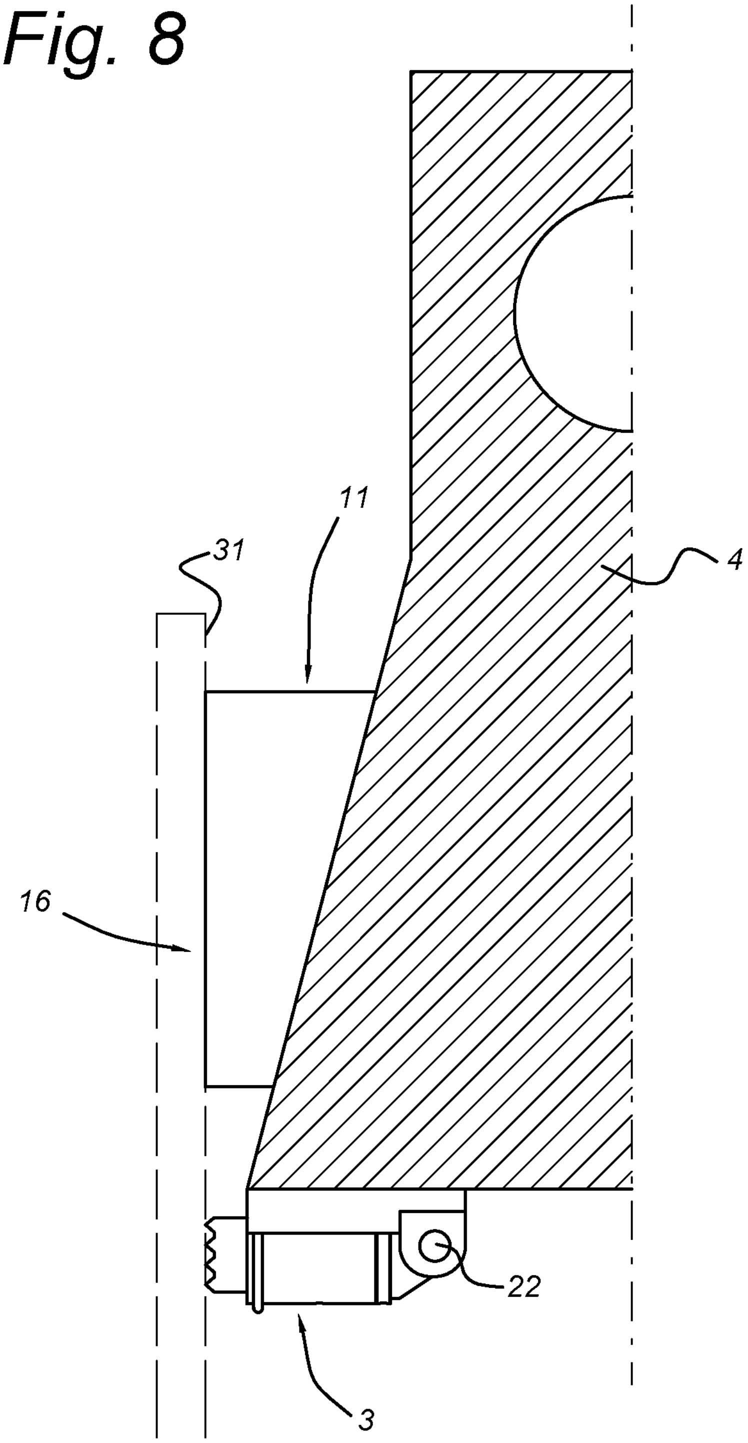
FIG. 8 shows a partial view in longitudinal section of a second embodiment of the clamp system.

The embodiment of the clamp system described before is fit for accommodating an object within the internal space 9 thereof. As an alternative, the clamp system may be carried out for introduction in the hollow space of a hollow object, as shown in FIG. 8. In this case, both the wedge assemblies 11 and the gripping devices engage the inner surface 31 of the object 16. The way of handling this clamp system and object is however similar to the clamp system described before.

LIST OF REFERENCE NUMERALS

1. Wedge type clamp
2. Series of gripping devices
3. Gripping device
4. Frame
5., 6. Frame half
7. Hinge
8. Actuator frame
9. Internal space of frame
10. Lug
11. Wedge assembly
12., 13. Wedge part
14. Slanting surfaces
15. Friction surface of wedge assembly
16. Object
17. Piston/cylinder device 18. Cylinder
19. Piston
20. Pressure surface
21. Mounting plate
22. Pivot
23. Hoisting cable
24. Spring element
25. Stop face
26. Actuator wedge assembly
27. Clamp system
28. Double hoisting block
29. Hoisting cable
30. External surface object
31. Internal surface object

The invention claimed is:

1. A camp system for a slender object, such as a pile or pipe and the like, said clamp system comprising a frame defining a longitudinal axis, wherein the object and the frame are to be arranged around one another in such a way that the longitudinal axis of the frame is generally parallel to the longitudinal axis of the object, as well as clamping means for clamping the object with respect to the frame, wherein the clamping means comprise: at least one gripping device which is rotatably connected to the frame according to an axis of rotation which is oriented transversely with respect to the longitudinal axis of the frame, said gripping device having a gripping state for clamping said object with respect to the frame and an idle state, and at least one stop which defines an end position of the gripping device (3), said gripping device in gripping state and positioned in said end position preventing the object from displacing with respect to the frame in a first axial direction along the longitudinal axis of the frame, in which first axial direction the gripping device is held pressed against the stop, and said gripping device allowing the object to displace with respect to the frame in a second axial direction opposite the first axial direction, and further comprising a wedge type clamp comprising wedge assemblies associated with the frame for providing frictional engagement with said object as a result of a relative displacement of the wedge type clamp with respect to the object according to the longitudinal axis, wherein the gripping device is arranged with respect to the wedge assemblies in such a way that during said relative displacement of the object and the wedge type clamp of said gripping device is transferred from the gripping state, in which the object is held with respect to the frame by the gripping devices, into the idle state so as to establish said frictional engagement between the wedge assemblies and the object.

2. Clamp system according to claim 1, wherein a gripping device is mounted to the frame by means of a respective pivot and which gripping device is displaceable between an active position which is radially oriented with respect to the longitudinal axis of the frame and an inactive position slanted with respect to the radially oriented active position.

3. The clamp system according to claim 2, wherein the stop is provided on the frame and/or a base or mounting.

4. The clamp system according to claim 3, wherein a gripping device is biased toward the stop, such as by an elastic pretension.

5. The clamp system according to claim 1, for introduction in a hollow object, wherein the gripping device is carried out for gripping the internal surface of the hollow object.

6. The clamp system according to claim 1, wherein the frame delimits a passage for accommodating the object and the gripping device is carried out for gripping the external surface of the object.

7. The clamp system according to claim 6, wherein the frame comprises frame halves which are connected to each other through a hinge the hinge axis of which is generally parallel to the longitudinal axis of the frame, said frame halves being transferrable between an active position closed onto each other around the object, and an open position in which the frame can be positioned on the object.

8. The clamp system according to claim 7, wherein closure means are provided on the frame halves for holding said frame halves pressed onto each other respectively for giving said frame halves free.

9. The clamp system according to claim 1, wherein the gripping device is carried out for gripping the internal surface of the hollow object, and the wedge assemblies and gripping device are oriented outwardly with respect to the frame for engagement with the internal surface of the hollow object.

10. A method for lifting a hollow slender object by means of the clamp system according to claim 9, comprising the steps of: introducing the frame in the lying object, activating the wedge assemblies so as to engage the internal surface of the lying object, activating one or more gripping devices so as to grip the internal surface of the lying object, lifting the object gripped by the gripping device(s) and transferring said object towards an upright position, during the process of transferring the object to the upright position, displacing the object with respect to the frame so as to provide or increase frictional engagement between the wedge assemblies thereof and the object, and during the process of transferring the object to the upright position, transferring the gripping device(s) from the gripping state into the idle state.

11. The method according to claim 10, comprising the step of: during the process of transferring the object to the upright position, transferring one or more gripping devices from the gripping state into the idle state by making the gripping device(s) rotate about the respective tangentially oriented axis of rotation thereof.

12. The method according to claim 10, comprising the steps of: displacing the object with respect to the clamp under the influence of gravity as a result of transferring the object towards the upright position, during the step of displacing the object with respect to the wedge type clamp, pivoting the gripping device(s) out of the gripping position into the idle position.

13. The clamp system according to claim 1, wherein the frame delimits a passage for accommodating the object, the gripping device is carried out for gripping the external surface of the object, and the wedge assemblies and gripping device are oriented inwardly with respect to the frame for engagement with the external surface of the object.

14. The method for lifting a slender object by means of the clamp system according to claim 13, comprising the steps of: fitting the frame around a lying object, activating the wedge assemblies so as to engage the external surface of the lying object, activating one or more gripping devices so as to grip the external surface of the lying object, lifting the object gripped by the gripping device(s) and transferring said object towards an upright position, during the process of transferring the object to the upright position, displacing the object with respect to the frame so as to provide or increase frictional engagement between the wedge assemblies thereof and the object, and during the process of transferring the object to the upright position, transferring the gripping device(s) from the gripping state into the idle state.

15. The clamp system according to claim 1, wherein a gripping device (3) is positioned at a distance in axial direction from the wedge assemblies (11).

16. The clamp system according to claim 1, wherein a gripping device is pivotable out of the radial position in accordance with the direction of relative displacement of the object with respect to the frame which causes frictional engagement between the wedge assemblies and the frame.

17. The clamp system according to claim 1, wherein the frame has opposite axial ends and a gripping device is positioned on the end which faces in the clamping direction of the wedge assemblies.

18. Clamp system according to claim 1, wherein a plurality of gripping devices is provided, said gripping devices being spaced around, and being oriented transversally with respect to, the longitudinal axis of the frame.

* * * * *